(12) United States Patent
Ootera (10) Patent No.: US 7,283,459 B2
(45) Date of Patent: Oct. 16, 2007

(54) OPTICAL DISK AND OPTICAL DISK APPARATUS

(75) Inventor: Yasuaki Ootera, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 759 days.

(21) Appl. No.: 10/679,273

(22) Filed: Oct. 7, 2003

(65) Prior Publication Data

US 2004/0071074 A1 Apr. 15, 2004

(30) Foreign Application Priority Data

Oct. 7, 2002 (JP) ............... 2002-294008

(51) Int. Cl.
*G11B 7/24* (2006.01)
(52) U.S. Cl. .................................. 369/275.4
(58) Field of Classification Search .. 369/275.1–275.5, 369/109.02, 109.01, 277, 278, 279; 428/64.4, 428/64.5
See application file for complete search history.

(56) References Cited

U.S. PATENT DOCUMENTS 5,946,288 A 8/1999 Ogawa 6,556,537 B1 * 4/2003 Endoh ...................... 369/275.4
6,819,650 B2 * 11/2004 Deno et al. ............... 369/275.4

FOREIGN PATENT DOCUMENTS

| JP | 10-302310 | 11/1998 |
|---|---|---|
| JP | 10-302321 | 11/1998 |

OTHER PUBLICATIONS

Chinese Office Action dated Dec. 24, 2004 for Appln. No. 03160195.2.
Japanese Office Action dated Nov. 9, 2004 for Japanese Patent Application No. 2002-294008.

* cited by examiner

*Primary Examiner*—Ali Neyzari
(74) *Attorney, Agent, or Firm*—Pillsbury Winthrop Shaw Pittman, LLP (57) ABSTRACT

There is provided an optical disk which adopts a PRML (Partial Response and Maximum Likelihood) method for reproduction of recorded information and whose shortest pit has a conical shape without a bottom surface. If the PRML method is adopted, since it is not necessary to assure a large amplitude of a reproduction waveform of the shortest pit, the pit may have a conical shape. The conical pit enables recording with the dense shortest pit even in a conventional original disk recorder and original disk exposure process, thereby increasing a recording density in a dividing direction.

1 Claim, 6 Drawing Sheets

Jitter 12.6%
Error rate: Measurement is impossible because of large asymmetry

FIG. 5

Jitter 13.4%
Error rate: $4 \times 10^{-6}$

OPTICAL DISK AND OPTICAL DISK APPARATUS

CROSS-REFERENCE TO RELATED APPLICATIONS

This application is based upon and claims the benefit of priority from the prior Japanese Patent Application No. 2002-294008, filed Oct. 7, 2002, the entire contents of which are incorporated herein by reference.

BACKGROUND OF THE INVENTION

1. Field of the Invention

The present invention relates to an optical disk, and more particularly to a shape of an information pit formed on an optical disk.

2. Description of the Related Art

In an optical disk, pits are carved on a transparent molded substrate at a part where data is recorded in advance, e.g., a pre-formatted portion of an RAM disk or an ROM disk. Such a pit is irradiated with a laser beam through a molded substrate from a surface opposite to the surface on which the pit is formed, and information is read.

Although the pit is formed with different sizes in accordance with recording information, its size is a sub-micron order. Forming a pit as small and accurate as possible is important to increase a recording density of the optical disk.

For example, in a current DVD-ROM, the shortest pit length (size in a circumferential direction) is 0.40 µm, a depth is approximately 100 nm, and a bottom forms a smooth conical trapezoid. In the conventional DVD, a time length of each pit is detected by slicing (binarizing) a reproduction waveform by a predetermined threshold value, and reproduces information by converting this length into data. However, in order to correctly reproducing information by this method, the pit length must be stably formed, and a signal amplitude which is sufficient for enabling slicing must be obtained. Therefore, the shortest pit shape must be conical trapezoid with a flat bottom, and this is one factor determining a limit of the recording density. A bottom circumferential size of the shortest pit is stipulated to, e.g., (0.2 to 0.25)×(wavelength)/NA/1.14 µm. Here, NA is a numerical aperture of an object lens.

As one conformation of an optical disk for coming generation, for example, Jpn. Pat. Appln. KOKAI Publication No. 10-302310 proposes a mode of reading a signal through a cover layer having a thickness of approximately 0.1 mm.

The optical disk having such a conformation is the same as a conventional optical disk in that a reflecting film is formed on irregularities provided to the molded substrate and this film is irradiated with a laser beam in order to read a signal. In case of this conformation, however, as different from a conventional optical disk such as a CD or a DVD, the laser beam is transmitted through a cover layer instead of the molded substrate, and the reflecting film is irradiated with this laser beam.

The irregularities called the pit have a size of a sub-micron order, and how correctly the small pit can be formed is one important element which determines a signal quality and a recording density of the optical disk.

In the conventional optical disk which reads a signal by slicing a reproduction waveform by using a predetermined threshold value and binarizing it, the pit must be formed in such a manner that a reproduction waveform amplitude can be stably and largely obtained even in case of the shortest pit. Therefore, since a conical trapezoidal shape having a flat bottom surface must be assured even in the shortest pit, the recording density of the optical pit cannot be increased any further.

Further, like the prior art, when the shortest pit shape is formed into a conical trapezoid having a bottom surface and a large reproduction amplitude of a closest signal is assured, a difference between the shortest pit and the second shortest pit becomes small, and it is hard to discriminate a reproduction signal waveform of the shortest pit and a reproduction signal waveform of the second shortest pit. This becomes a serious factor of erroneous reading of a signal.

Furthermore, in a cover layer type disk that a reflecting film surface is irradiated with a laser beam instead of a substrate through a cover layer and information is read, or a Blu-Ray disc, when the shortest pit length is dense to the limit in order to increase the recording density, forming a metallic reflecting film may fill up the shortest pit in some cases. In such a case, there occurs a problem that a reproduction signal is deteriorated.

BRIEF SUMMARY OF THE INVENTION

A shape of the shortest pit is determined as a conical shape having no bottom surface, and a PRML (Partial Response and Maximum Likelihood) mode is used for reproduction of recording information. When the PRML mode is adopted, since it is not necessary to assure a large amplitude of a reproduction waveform from the shortest pit, the pit may have a conical shape. When the conical pit can suffice, the shortest pit can be dense and information can be recorded even in a conventional original board recorder or original board exposure process, thereby increasing a recording density in a circumferential direction.

In a cover layer type disk, a bottom width in a molded substrate having the shortest pit is determined as 2×(reflecting film thickness)×sin (pit wall angle) (within ±20%). By doing so, the pit can be prevented from being filled up by formation of the reflecting film, while the pit has a conical shape with a size suitable for increasing the density after formation of the film.

In this manner, the bit bottom width is stipulated, the conical trapezoidal pit is formed on the molded substrate, and the film is formed thereon. As a result, the bottom surface is filled, and the conical pit is formed. Consequently, the high-recording density pit with the excellent asymmetry can be manufactured by using a current original board production process while suppressing irregularities in shape.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described in detail hereinafter with reference to the accompanying drawings. The following describes embodiments according to the present invention, and does not restrict an apparatus and a method according to the present invention.

Figure 1A:
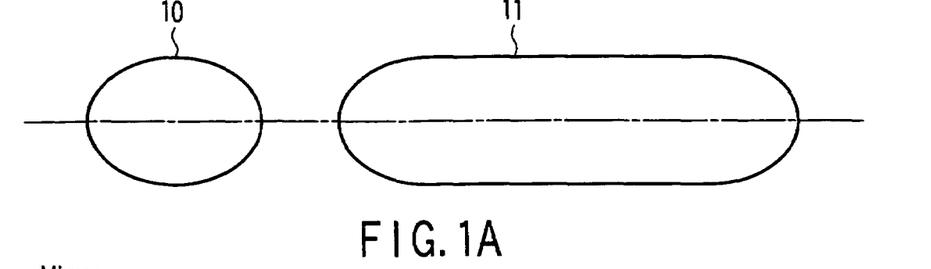
FIG. 1A is a plane view showing a pit shape of a conventional optical disk.
Figure 1B:
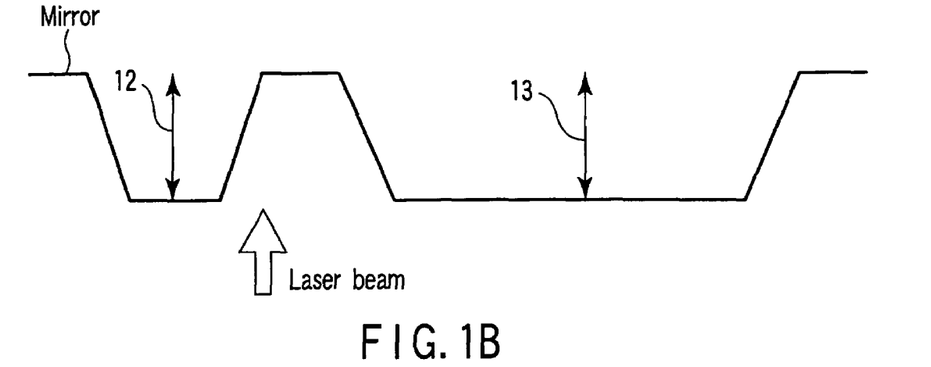
FIG. 1B is a cross-sectional view.
Figure 2A:
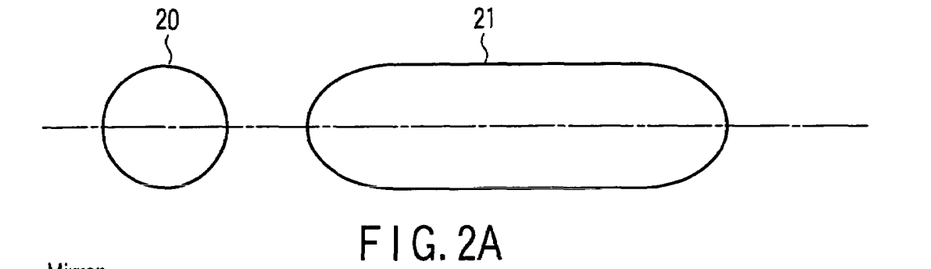
FIG. 2A is a plane view showing a pit shape of an optical disk according to a first embodiment of the present invention.
Figure 2B:
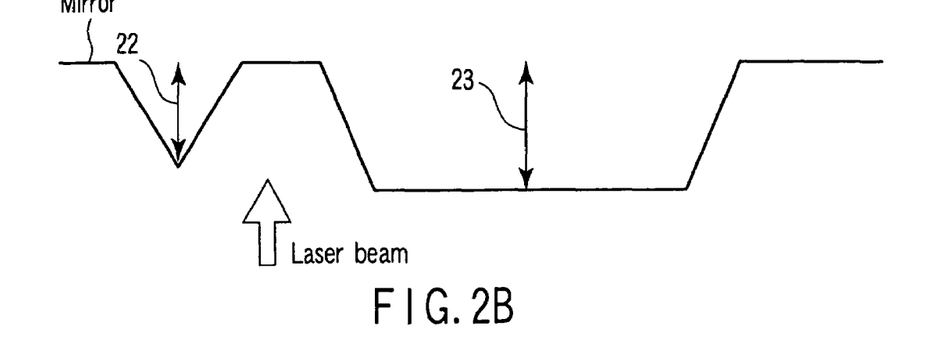
FIG. 2B is a cross-sectional view.
Figure 3:
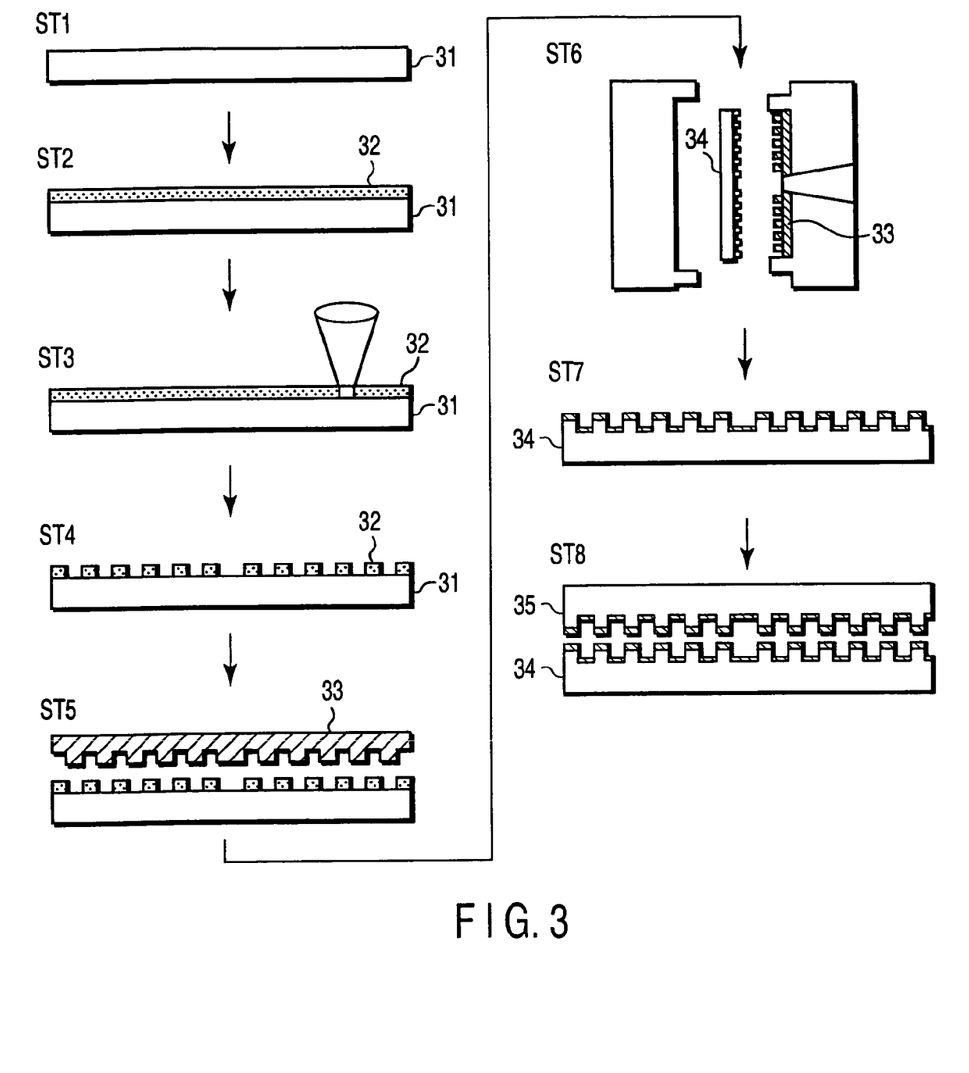
FIG. 3 is a flow diagram of an optical disk manufacturing method.
Figure 4A:
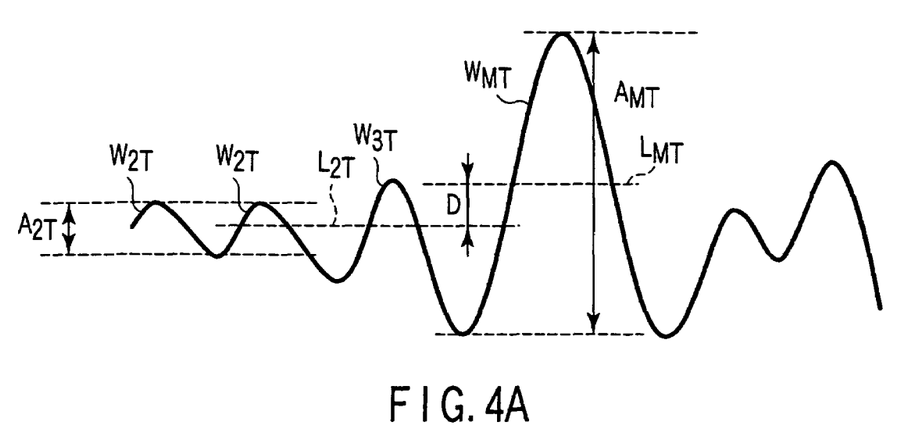
FIGS. 4A and 4B show reproduction waveforms of respective pits.
Figure 4B:
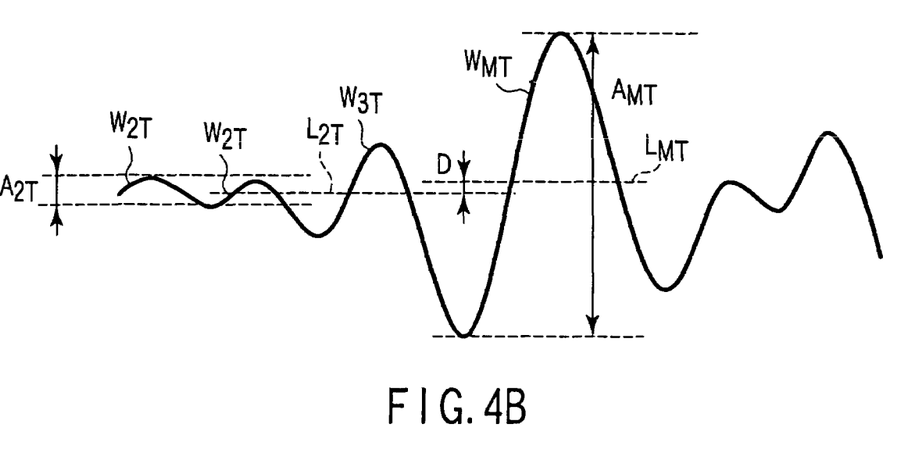
Figure 5:
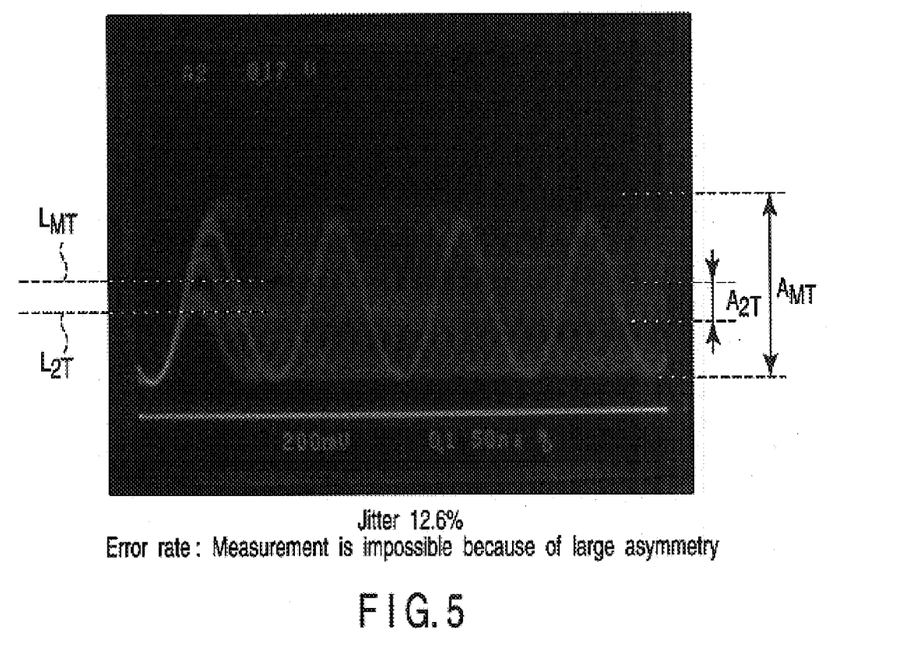
FIG. 5 shows a reproduction waveform of an optical disk having a density of 15 GB/plane class manufactured using a conventional pit shape.

FIG. 1A is a plane view showing a pit shape of a conventional optical disk; FIG. 1B, a cross-sectional view; FIG. 2A, a plane view showing a pit shape of an optical disk according to a first embodiment of to the present invention; FIG. 2B, a cross-sectional view; FIG. 3, a flow diagram of an optical disk manufacturing method; FIG. 4, a reproduction signal waveform chart of each pit; FIG. 5, a reproduction waveform chart of an optical disk having a density of 15 GB/plane class manufactured using a conventional pit shape; and FIG. 6, a reproduction waveform chart of an optical disk having a density of 15 GB/plane class manufactured using a pit shape according to the present invention.

In the optical disk, usually, the disk on which pits such as shown in FIG. 1 are recorded is read by using a laser beam, and the information is reproduced. The laser beam enters the optical disk in a direction indicated by an arrow in FIG. 1B, and the information is read based on an intensity of a reflected light beam.

In this embodiment, although it is determined the disk has a diameter of 120 mm and a thickness of 1.2 mm (lamination of two substrates each having a thickness of 0.6 mm) and it is an ROM disk dedicated to reproduction, the present invention is not restricted thereto, it is possible to adopt a disk having a cover layer of 0.1 mm attached to a substrate of 1.1 mm, and it includes a pre-pit portion of an RAM disk.

In FIG. 1, reference numeral 10 denotes the shortest pit; 11, another pit; 12, a depth of the shortest pit; and 13, a depth of another pit. In FIG. 2, reference numeral 20 designates the shortest pit; 21, another pit; 22, a depth of the shortest pit; and 23, a depth of another pit.

A method of manufacturing a disk having such pits will now be described hereinafter with reference to FIG. 3. First, as an original board, a glass original board 31 having a surface polished and cleansed is used (ST 1). A photoresist 32 is applied to the glass original board surface (ST 2), and this surface is exposed by using a laser beam, thereby recording information (ST 3). Then, the photoresist on the exposed glass original board is etched, irregularities of pits are formed (ST 4). This glass original board is subjected to plating processing, thereby producing a stamper 33 (ST 5). This stamper 33 is used as a die, and a resin (generally, polycarbonate) molded plate 34 is manufactured by injection molding (ST 6). Thereafter, a reflecting film or a recording film is formed on the molded plate 34 (ST 7), and this plate is attached to another molded plate 35 manufactured in the similar manner (ST 8), thereby bringing the optical disk to completion. In this embodiment, a thickness of each of the molded substrates 34 and 35 is 0.6 mm.

In the conventional optical disk, a pit bottom surface is formed flat even in case of the shortest pit as shown in FIG. 1. That is because an amplitude of a reproduction signal from the shortest pit tends to become very small and binarization is impossible by slicing a reproduction waveform by a predetermined threshold value as it is. Using a conical trapezoid in this manner can increase the amplitude slightly and enable slicing. In this case, only a pit length of the shortest pit is set longer than a theoretical value. For example, when a pit corresponding to a 2T code (T: a length corresponding to a reference clock cycle) is the shortest pit, a pit length of the 2T code is set longer than ⅔ of a pit length of, e.g., a 3T code. That is, only the pit of the 2T code has a length which is not proportionate to a code value.

When manufacturing a disk based on steps such as shown in FIG. 3, a depth of the shortest pit depends on a film thickness of the photoresist 32, a tilt angle of a wall surface of the pit depends on an intensity distribution in a laser spot and a characteristic and an etching condition of the photoresist 32. A depth of the pit is restricted to $\lambda/4n$ ($\lambda$: a reproduction wavelength, n: a refractive index of a substrate) in case of an optically ROM in order to obtain a reproduction signal, and a tilt angle of the pit is approximately 40 degrees in the current process technology. In this case, in order to flatten the bottom surface of the shortest pit as shown in FIG. 1, the length of the shortest pit cannot be greatly reduced. Therefore, it can be understood that the recording density in the disk circumferential direction is not very high.

On the other hand, in the optical disk for coming generation, it has been examined that information is reproduced by using a mode called a PRML (Partial Response and Maximum Likelihood) method in place of reading a signal by a binarization method based on slicing of a reproduction waveform like the prior art. This mode converts a reproduction signal from each pit into multiple values based on its waveform and amplitude level. In case of this mode, it is desirable that the reproduction signal from the shortest pit is small so that it can be recognized as a signal from the shortest pit. Therefore, it is not necessary to form a pit bottom surface by setting only the pit of the shortest code longer than a value which is proportionate to the code and increase the signal amplitude as described above. On the contrary, since the PRML reads information on the amplitude level, centers of the reproduction signal amplitudes from the respective pits must match with each other. That is, the PRML cannot be applied unless the asymmetry (which will be described later) is close to 0.

Base on these points, the pit shape which realizes a high-recording density suitable for the PRML is the first embodiment according to the present invention shown in FIG. 2. A characteristic of this pit shape lies in that the shortest pit does not have a flat bottom surface but has a conical shape and its depth 22 is smaller than a depth 23 of another pit. An inclination of a wall surface of the shortest pit is equal to that of the conventional pit shown in FIG. 1.

The conventional shortest pit shape which is a conical trapezoidal shape has a limit in reducing the shortest pit length since the tilt angle of the pit wall surface is gentle. However, if this conical shape is adopted, even the current original board process technology can greatly reduce the shortest pit length, thereby considerably increasing the recording density.

Since the shortest pit has a conical shape and its bottom surface is not flat, a reproduction amplitude from the shortest pit becomes small. Further, irregularities in pit size (mainly a depth 22) caused due to unstableness of the exposure process slightly become large. However, these phenomena which are serious drawbacks in reproduction by the slice method hardly become shortages when using the PRML method. Conventionally, there is no optical disk product having a conical pit nor a concept of reading the conical pit by using the PRML method.

In this embodiment, since the bottom surface of the shortest pit is not formed, the asymmetry of the reproduction waveform can approximate 0. FIG. 4A shows a reproduction signal waveform obtained when reproducing a pit having a conventional shape, and FIG. 4B shows a reproduction signal waveform obtained when reproducing a pit having a shape according to the present invention. In FIG. 4, reference character W2T denotes a reproduction signal waveform of a 2T code pit (shortest pit); W3T, a reproduction signal waveform of a 3T code pit; WMT, a reproduction signal waveform of a longest code pit; A2T, an amplitude of a 2T code pit reproduction signal; AMT, an amplitude of a longest code pit reproduction signal; L2T, a central level of a 2T code pit reproduction signal waveform; LMT, a central level of a reproduction signal waveform of a longest code pit; and D, a level difference (LMT−L2T) obtained by subtracting the central level L2T from the central level LMT.

Although the asymmetry can be defined with respect to the pit reproduction signal of each code, it is determined as the asymmetry of the 2T code which is most important in the present invention. That is, here, the asymmetry is determined as a value (D/AMT) obtained by dividing the level difference D by the reproduction signal waveform amplitude AMT of the longest code pit.

Assuming that an area where the pit is formed is a pit area and an area where no pit is formed is a mirror area, the mirror area has a high reflected light level than that of the pit area (see FIGS. 1 and 2). In the prior art as shown in FIG. 4A, although the asymmetry has a large value, this is because the pit length of the conventional shortest pit is set longer than a value which is in proportion to the code and the central level of the reproduction signal waveform of the shortest pit is lower than that of a pit of any other code.

As shown in FIG. 4B, in regard to the reproduction signal waveform of the pit having the shape according to the present invention, the reproduction signal amplitude A2T of the shortest pit is smaller than that of the prior art shown in FIG. 4A, and the asymmetry (D/AMT) also becomes small. That is because the shortest pit has a conical shape and the reflected light level in the vicinity of the area where the shortest pit is formed is higher than that of the prior art.

Furthermore, since the signal amplitude of the shortest pit is small in accordance with the pit length, it is easy to discriminate the shortest pit (e.g., 2T) and the second shortest pit (e.g., 3T). Thus, conical shape of the shortest pit is advantageous in PRML reproduction. According to the pit shape of the present invention, the asymmetry can readily approximate +0.10 or lower (preferably within a range of ±0.10). Defining a value obtained by dividing the shortest pit reproduction signal amplitude A2T by the maximum amplitude AMT (A2T/AMT) as a resolution, a resolution of not more than 15% can be easily realized in the present invention. It is to be noted that, in the present invention, the 2T code pit is preferably constantly formed into a conical shape in order to facilitate identification of the 2T code pit (shortest pit) and the 3T code pit. That is, when the shortest pit (2T) is formed in proportion to the code (3T, 4T, . . . ), the shortest pit is always formed into a conical shape even if the shortest pit has a flat bottom portion. In such a case, a circumferential length of the shortest pit (2T) is not in proportion to the pit lengths of other codes.

Figure 6:
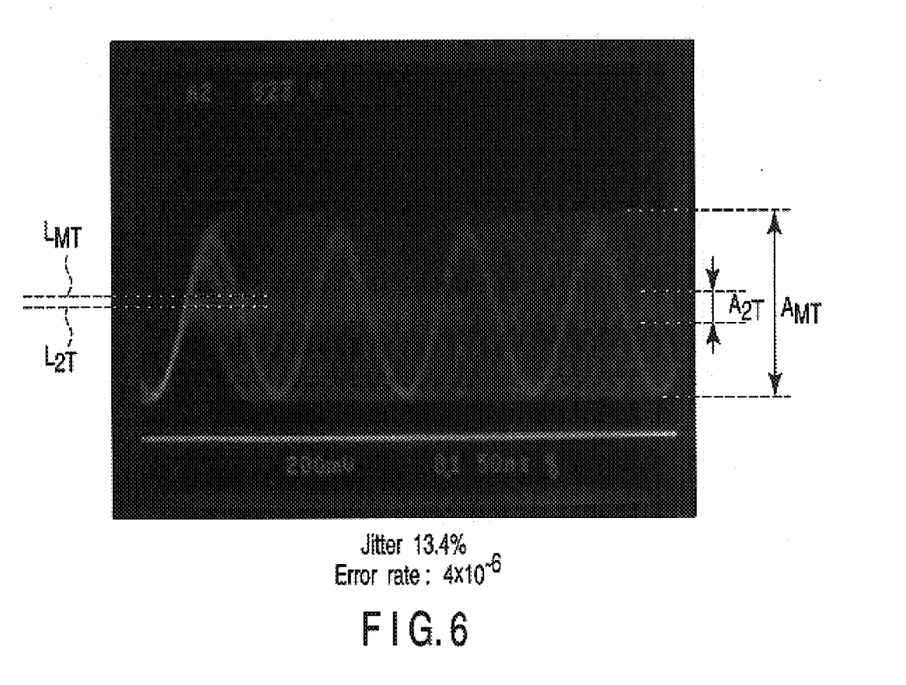
FIG. 6 shows a reproduction waveform of an optical disk having a density of 15 GB/plane class manufactured using a pit shape according to the present invention.

FIGS. 5 and 6 respectively show results of manufacturing disks of 15 GB/plane class with the pit shape according to the prior art and the pit shape according to the present invention by trial and reproducing information.

FIG. 5 shows a signal reproduction waveform of an optical disk having the conventional pit shape (FIG. 1), and the jitter obtained by the slice method is 12.6% since the signal amplitude A2T of the shortest pit (2T) is large, but reproduction by the PRML method cannot be performed because of the large asymmetry and an error rate cannot be measured. On the other hand, FIG. 6 shows a pit shape according to the present invention (FIG. 2), and the jitter is 13.4% which is relatively bad since the shortest signal amplitude A2T is small, but the asymmetry is good and an error rate is 4×10−6 in reproduction by PRML, which is a level making practicable.

As described above, in the optical disk that information is reproduced by the PRML method, using the pit shape according to the present invention can increase the recording density in a disk tangential direction even in the conventional original board process, and the asymmetry is also improved, thereby enhancing the error rate.

A second embodiment according to the present invention will now be described. FIG. 7 are plane views showing a pit shape of an optical disk according to the present invention, and FIG. 8 is a cross-sectional view when forming a film on the shortest pit of the optical pit according to the second embodiment of the present invention.

Figure 7A:
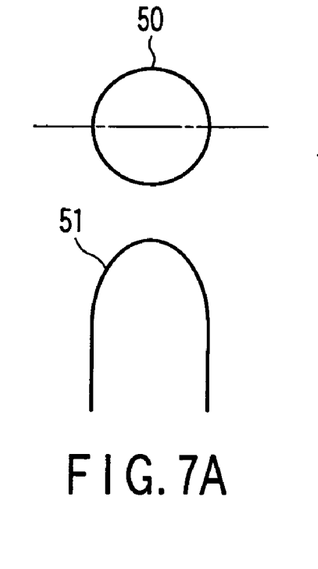
FIGS. 7A and 7B show pit shapes of an optical disk according to a second embodiment of the present invention.
Figure 7B:
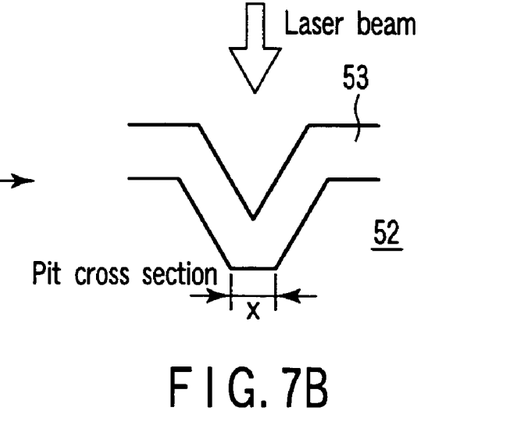
Figure 8:
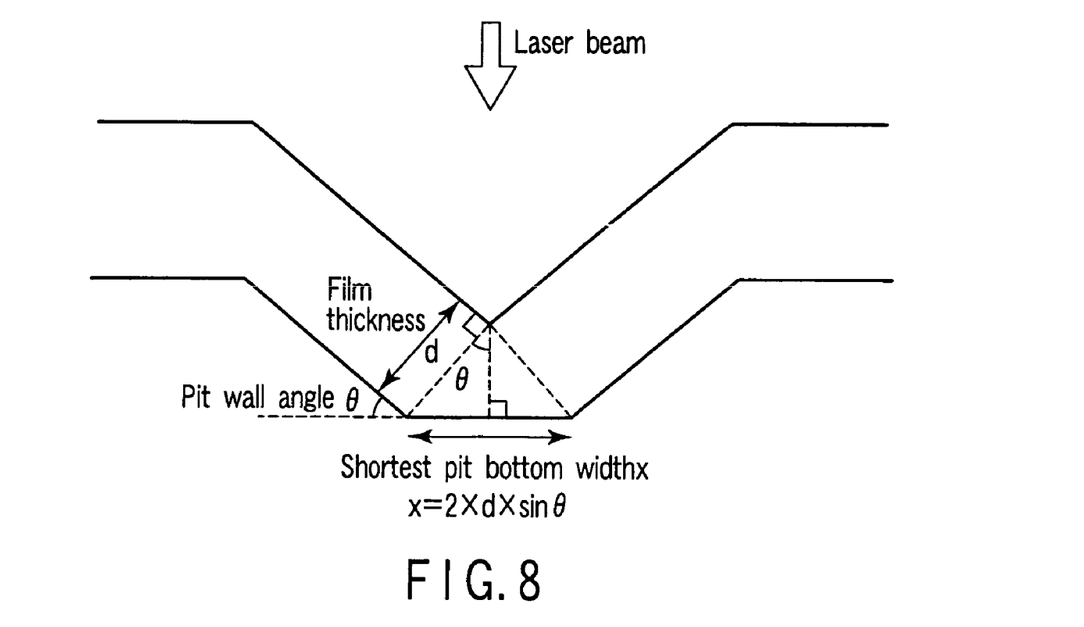
FIG. 8 is a cross-sectional view when a film is formed on the shortest pit of the optical disk according to the present invention.

In FIG. 7A, reference numeral 50 denotes the shortest pit, and 51 designates another pit. In FIG. 7B, reference numeral 52 denotes a molded substrate; 53, a reflecting film; x, a shortest bit bottom width on the molded substrate. In the present invention, a target is an optical disk which is of a type that a laser beam enters from a side opposite to the molded substrate 52 as indicated by an arrow in FIG. 7B (e.g., a disk which is of a surface recording type or a type that information is read through a cover layer of approximately 0.1 mm or an L1 layer in a conventional two-layer DVD disk). That is, an incident direction of the laser beam is an opposite direction as compared with the optical disk shown in FIG. 1 or 2.

In the conventional optical disk, since the recording density is low, the bottom width x of the shortest pit is sufficiently wider than a film thickness of the reflecting film 53. Therefore, there occurs no problem even if the reflecting film is formed on the bit, the film is irradiated with the light from the direction indicated by an arrow and a signal is read. However, in case of the high-density optical disk for coming generation, when using the PRML mode in signal reproduction or when using a code series that the shortest pit is 2T in particular, since the recording line density is very high, the bottom width x of the shortest pit approximates 0 in the current original board manufacturing process technology. In this case, the shortest pit is filled by forming the film, and reading the signal from the direction indicated by an arrow deteriorates the reproduction signal.

On the contrary, when the bottom width of the shortest pit is set larger than a value which is in proportion to the code, this becomes disadvantageous for increasing the density, and discrimination of the shortest pit and the second shortest pit becomes difficult because of the extremely large signal from the shortest pit, thereby degrading the asymmetry. In particular, since the asymmetry is important when using the PRML mode in signal reproduction, the pit length of the shortest pit cannot be set larger than a value which is in proportion to the code in the light of this point.

For the reasons mentioned above, the shortest pit must be set as small as possible in a range which does not fill the shortest pit and does not lead to degradation in the signal. Thus, in the present invention, as shown in FIG. 8, the bottom width x of the shortest pit is determined as $x=2 \times d \times \sin\theta$ (within ±20%) (d: a thickness of the reflecting film, $\theta$: a wall angle of the pit).

That is, in the optical disk according to this embodiment, the cross-sectional shape of the shortest pit is trapezoidal in the molded substrate and triangular on the surface of the reflecting film. Namely, when manufacturing such an optical disk, as to the shortest pit, the pit cross-sectional shape before forming the reflecting film is trapezoidal, and the pit cross-sectional shape after forming the reflecting film is triangular.

By stipulating the shortest pit to this size, the pit is not filled by formation of the film, and the signal is not deteriorated. Additionally, since the conical pit can be obtained after forming the film, the intensity of the signal from the shortest pit can be appropriately suppressed. As a result, it is possible to prevent deterioration in the asymmetry or erroneous reading of signals from pits with any other sizes, especially erroneous reading of the 2T and 3T pits.

In the optical disk manufactured by the current original board manufacturing process technology, the wall angle $\theta$ of the pit is generally approximately 40 degrees. Further, if a blue laser beam is used as a reproduction light ray, when trying to obtain the reflectivity of, e.g., approximately 70%, the reflecting film thickness of approximately 25 nm is required in case of Al (aluminium), and approximately 50 nm is required in case of Ag (silver). Applying these parameters to the expression of this embodiment, the bottom width of the shortest pit is 32±6 nm in case of Al, and it is 64±13 nm in case of Ag.

It is to be noted that only the bottom width x of the shortest pit is not in proportion to the bottom width of another pit. That is, in cases where the shortest pit is the 2T code pit, the bottom width x is not ⅔ of, e.g., the 3T code pit, but it is set in accordance with a thickness of the reflecting film. Furthermore, the bottom width x is a value which is not directly proportionate to the recording density.

Advantages obtained when stipulating the shortest pit to this size will now be described. First, when manufacturing the disk, the pit shape and the reproduction signal are stabilized since the pit cross section of the molded substrate has a trapezoidal shape. That is because, when the cross section of the molded substrate has a triangular shape, irregularities in original board exposure condition or irregularities in film thickness when forming the film scatter the pit size, and the reproduction signal from that pit is sensitively affected by the pit size and becomes unstable. As another advantage, this size is a limit size that the pit is not filled when forming the film. As a result, the pit can become dense to the limit density which does not fill the pit and does not deteriorate the reproduction signal. Moreover, since the bottom is filled and the conical pit shape can be obtained after forming the film, the reproduction signal from the shortest bit does not become too large, and the asymmetry approximates 0, which is also advantageous in discrimination of the signal.

As described above, in the optical disk to which the light enters from the surface opposite to the molded substrate in order to reproduce information, the shortest pit has a conical shape after forming the film by using the pit shape according to the present invention, and the signal waveform from the shortest pit can be appropriately obtained while increasing the recording density.

Figure 9:
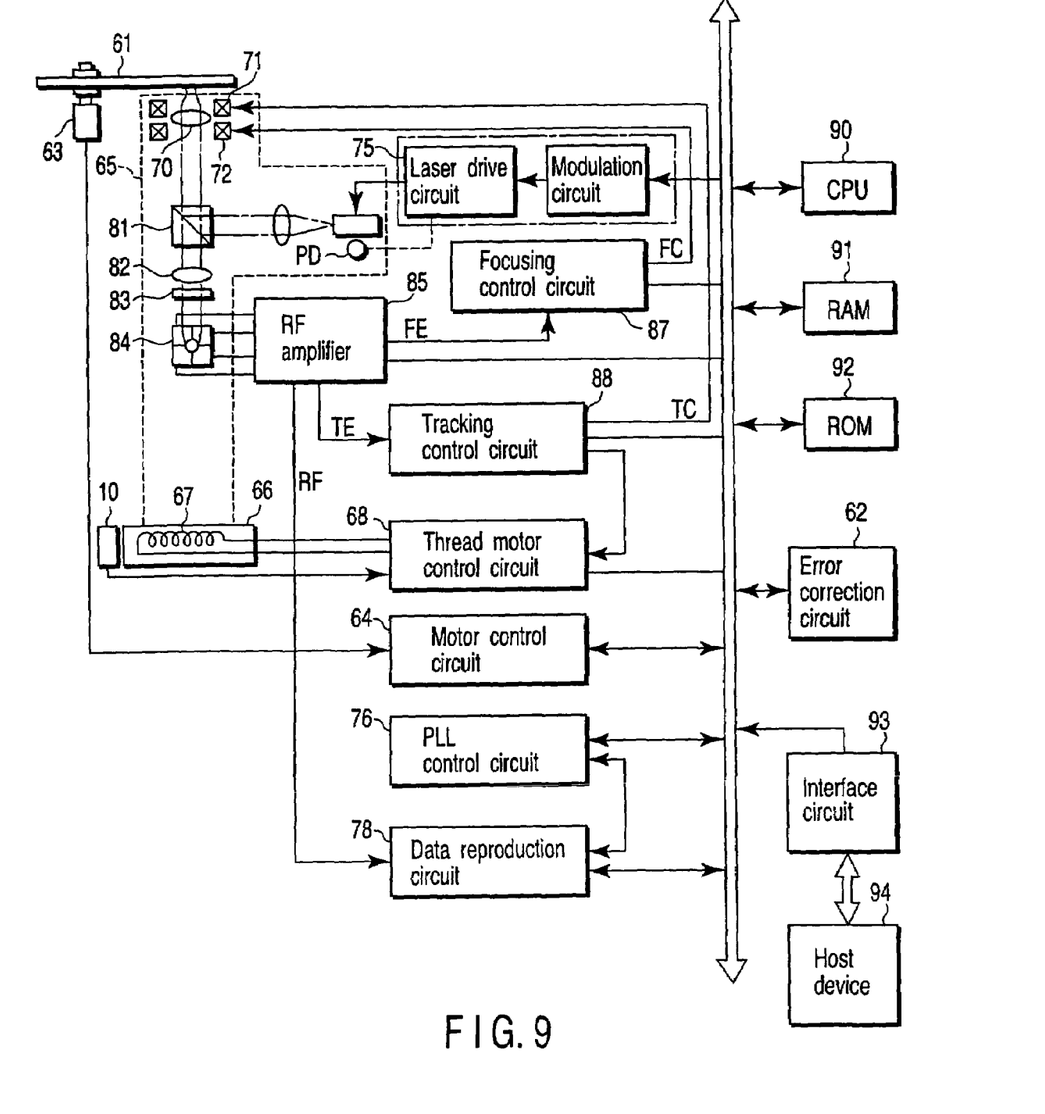
FIG. 9 is a block diagram showing a structure of an optical disk apparatus according to the present invention.

Description will now be given as to an embodiment of an optical disk apparatus which records/reproduces information by using the optical disk having the pit with the above-described shape formed thereto. FIG. 9 is a block diagram showing a structure of the optical disk apparatus according to this embodiment.

An optical disk 61 is an optical disk dedicated to reading or an optical disk which can record user data. The disk 61 is rotated and driven by a spindle motor 63. Recording and reproduction of information with respect to the optical disk 61 are carried out by an optical pickup head (which will be referred to as a PUH hereinafter) 65. The PUH 65 is connected to a thread motor 66 through a gear, and this thread motor 66 is controlled by a thread motor control circuit 68.

A seek destination address of the PUH 65 is inputted to the thread motor control circuit 68 from a CPU 90, and the thread motor control circuit 68 controls the thread motor 66 based on this address. A permanent magnet is fixed inside the thread motor 66, and the PUH 65 moves in a radial direction of the optical disk 61 when a drive coil 67 is excited by the thread motor control circuit 68.

To the PUH 65 is provided an object lens 70 which is supported by a wire or a flat spring which is not illustrated. The object lens 70 can move in a focusing direction (direction of an optical axis of the lens) by drive of a drive coil 72, and it can move in a tracking direction (direction orthogonal to the optical axis of the lens) by drive of a drive coil 71.

A semiconductor laser 79 emits a laser beam by a laser drive circuit 75 in a laser control circuit 73. The optical disk 61 is irradiated with the laser beam emitted from the semiconductor laser 79 through a collimator lens 80, a half prism 81 and an object lens 70. The reflected light from the optical disk 61 is led to a photodetector 84 through the object lens 70, the half prism 81, a condensing lens 82 and a cylindrical lens 83.

The photodetector 84 consists of, e.g., four divided photodetector cells, and a detection signal from each divided photodetector cell is outputted to an RF amplifier 85. The RF amplifier 85 combines signals from the photodetector cells, and generates a focus error signal FE indicative of an error from just focusing, a tracking error signal TE indicative of an error between a beam spot center of the laser beam and a track center and an RF signal which is a full addition signal of the photodetector cell signals.

The focus error signal FE is supplied to the focusing control circuit 87. The focusing control circuit 87 generates a focus control signal FC in accordance with the focus error signal FE. The focus control signal FC is supplied to the drive coil 72 in the focusing direction, and focus servo is carried out so that the laser beam is constantly just focused on the recording film of the optical disk 61.

The tracking error signal TE is supplied to the tracking control circuit 88. The tracking control circuit 88 generates a tracking control signal TC in accordance with the tracking error signal TE. The tracking control signal TC is supplied to the drive coil 72 in the tracking direction, and tracking servo is carried out so that the laser beam constantly traces on the track formed on the optical disk 61.

When the focus servo and the tracking servo are effected, a change in reflected light from, e.g., the pit formed on the track of the optical disk 61 is reflected to the full addition signal RF of output signals from the respective photodetector cells of the photodetector 84. This signal is supplied to a data reproduction circuit 78. The data reproduction circuit 78 reproduces recorded data based on a reproduction clock signal from a PLL circuit 76.

When the object lens 70 is controlled by the tracking control circuit 88, the thread motor 66, i.e., the PUH 65 is controlled by the thread motor control circuit 68 in such a manner that the object lens 70 is positioned in the vicinity of a predetermined position in the PUH 65.

The motor control circuit 64, the thread motor control circuit 68, the laser control circuit 73, the PLL circuit 76, the data reproduction circuit 78, the focusing control circuit 87, the tracking control circuit 88, an error correction circuit 62 and others are controlled by a CPU 90 through a bus 89. The CPU 90 comprehensively controls this recording/reproducing apparatus in accordance with an operation command provided from a host device 94 through an interface circuit 94. Furthermore, the CPU 90 uses an RAM 91 as a working area and performs a predetermined operation in accordance with a program recorded in an ROM 92.

The data reproduction circuit 78 reproduces information by a binarization method which binarizes an information reproduction signal waveform by slicing using a threshold voltage or a PRML method which converts an amplitude of the information reproduction signal waveform into multiple values. It is designed to reproduce information of the optical disk that the asymmetry of a reproduction signal is not more than +0.10 and a ratio of a signal amplitude of the shortest pit relative to a signal amplitude of the longest pit, i.e., the resolution (A2T/AMT) is not more than 15% when reproducing information by the PRML method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An optical disk having a plurality of pits indicative of information, comprising:
    a shortest pit of the plurality of pits having a conical shape and having a depth smaller than a depth of a pit other than the shortest pit,
    wherein an asymmetry of a reproduction signal is smaller than +0.10 and a ratio of a reproduction signal amplitude of the shortest pit relative to a signal amplitude of the longest pit is smaller than 15%.

* * * * *